(12) United States Patent
McWhirter

(10) Patent No.: US 12,314,303 B2
(45) Date of Patent: May 27, 2025

(54) PATTERN-BASED MATCHING FOR POLICY ENGINES

(71) Applicant: Red Hat, Inc., Raleigh, NC (US)

(72) Inventor: Robert Kelly McWhirter, Wytheville, VA (US)

(73) Assignee: Red Hat, Inc., Raleigh, NC (US)

( * ) Notice: Subject to any disclaimer, the term of this patent is extended or adjusted under 35 U.S.C. 154(b) by 36 days.

(21) Appl. No.: 18/326,699

(22) Filed: May 31, 2023

(65) Prior Publication Data
US 2024/0403346 A1    Dec. 5, 2024

(51) Int. Cl.
G06F 16/00 (2019.01)
G06F 16/353 (2025.01)

(52) U.S. Cl.
CPC .................. G06F 16/353 (2019.01)

(58) Field of Classification Search
None
See application file for complete search history.

(56) References Cited

U.S. PATENT DOCUMENTS

| | | | |
|---|---|---|---|
| 7,302,440 B2* | 11/2007 | Britton | G06F 16/2462 |
| 7,937,319 B2* | 5/2011 | Kennis | G06F 21/55 |
| | | | 705/37 |
| 8,104,080 B2* | 1/2012 | Burns | G06F 9/44505 |
| | | | 717/121 |
| 10,812,588 B2* | 10/2020 | Cosby | H04L 67/1097 |
| 11,263,339 B2* | 3/2022 | Denker | H04L 63/105 |
| 2023/0195720 A1* | 6/2023 | McConnell | G06F 16/27 |
| | | | 707/694 |

OTHER PUBLICATIONS

CUE Configure Unify Execute, "Validate, define, and use dynamic and text-based data," accessed Apr. 12, 2023, 5 bages. https://cuelang.org/.
Seedwing, "Seedwing-Policy", accessed Apr. 12, 2023, 2 pages. https://docs.seedwing.io/seedwing/index.html.
GitHub—Seedwing, "GitHub—seedwing-io / seedwing-policy: A functional type system for policy inspection, audit and enforcement," accessed Apr. 12, 2023, 4 pages. https://github.com/seedwing-io/seedwing-policy.

* cited by examiner

*Primary Examiner* — Debbie M Le
(74) *Attorney, Agent, or Firm* — Dority & Manning, P.A.

(57) ABSTRACT

The technology disclosed herein receives an untyped data structure. The untyped data structure includes a plurality of data items and each data item includes a field identifier and corresponding data. A policy to evaluate the untyped data structure is identified based on one or more field identifiers of the untyped data structure. The policy specifies a field identifier and a corresponding type definition. The type definition of the field identifier specified in the identified policy is compared with data associated with a field identifier of the untyped data structure matching the field identifier of the identified policy. Based on the comparisons, determining whether the untyped data structure satisfies the identified policy.

20 Claims, 5 Drawing Sheets

```
┌─────────────────────────────────────────────────────────────────────────┐
│  Identifying, based on one or more type identifiers of the untyped data │
│  structure, a policy to evaluate the untyped data structure, wherein    │
│  the policy specifies a type identifier and a corresponding type        │
│  definition                                                             │
│                                                                         │
│                              210                                        │
└─────────────────────────────────────────────────────────────────────────┘
                                  │
                                  ▼
┌─────────────────────────────────────────────────────────────────────────┐
│  Compare the type definition of the type identifier specified in the    │
│  identified policy with data associated with a type identifier of the   │
│  untyped data structure matching the type identifier of the identified  │
│  policy                                                                 │
│                                                                         │
│                              220                                        │
└─────────────────────────────────────────────────────────────────────────┘
                                  │
                                  ▼
┌─────────────────────────────────────────────────────────────────────────┐
│  Determining, based on the comparisons, whether the untyped data        │
│  structure satisfies the identified policy.                             │
│                                                                         │
│                              230                                        │
└─────────────────────────────────────────────────────────────────────────┘
```

FIG. 2

```
┌─────────────────────────────────────────────────────────────────────┐
│   Identify one or more policies to evaluate an untyped data         │
│   structure, wherein each policy specifies a field identifier and   │
│   a corresponding type definition                                   │
│                                                                     │
│                              410                                    │
└─────────────────────────────────────────────────────────────────────┘
                                   │
                                   ▼
┌─────────────────────────────────────────────────────────────────────┐
│   For each policy of the one or more policies, determine whether    │
│   the untyped data structure satisfies a respective policy by       │
│   analyzing the untyped data structure for data associated with     │
│   a field identifier of the untyped data structure in view of a     │
│   type definition of a matching field identifier of the respective  │
│   policy.                                                           │
│                                                                     │
│                              420                                    │
└─────────────────────────────────────────────────────────────────────┘
```

FIG. 4

PATTERN-BASED MATCHING FOR POLICY ENGINES

TECHNICAL FIELD IDENTIFIER

The present disclosure is generally related to software supply-chain security, and more particularly, to pattern-based matching for policy engine.

BACKGROUND

Software supply chain is the process of creating, distributing, and maintaining software components of a software system. This is done by one or more entities, such as software developers, third-party vendors, open-source communities, or software distributors. Software supply chains are becoming increasingly important due to the growing reliance on third-party software components and open-source software. Software supply-chain security is typically used to ensure software component security throughout the software supply chain.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 depicts a flow diagram of an example method of pattern-based matching for policy engine, in accordance with one or more aspects of the present disclosure;

FIG. 4 depicts a flow diagram of an example method of pattern-based matching for policy engine, in accordance with one or more aspects of the present disclosure.

DETAILED DESCRIPTION

Described herein are methods and systems of pattern-based matching for policy engine. Software supply-chain security refers to the process of ensuring the security and integrity of the software components used in a particular software system, including those developed internally as well as those obtained from external sources. The software supply chain includes all the stages involved in the creation, testing, distribution, maintenance, and consumption of software components. Applying a policy to software supply-chain security involves defining a set of rules and guidelines that dictate how the software components should be developed, tested, and integrated into the larger software system. These policies may cover a range of topics, including code quality, security testing, vulnerability management, and access control. Typically, the simplest form of policy (e.g., procedural policies) involves manually scanning and qualifying the subject of the decision. This can be achieved through a code-based approach that scans through files, directories, or pull-requests, line-by-line, to determine whether they comply with the policy. While effective, procedural policies can be difficult to understand, extend, and rationalize.

Aspects of the present disclosure address the above-noted and other deficiencies by providing a policy engine that performs pattern-based matching using data types, functions, third-party request, etc. For example, the policy engine may receive an untyped data structure. The policy engine may evaluate the untyped data structure against a policy. The policy may define a field identifier and a type definition. The field identifier refers to an identifier associated with a field. The type definition defines a data type, a third-party request, an internal request, a function, a policy, a value, or etc. associated with the field identified by the field identifier. The policy engine may determine whether one or more field identifiers of the untyped data structure matches field identifiers of the policy. Based on the one or more field identifiers of the untyped data structure matching the field identifiers of the policy, the policy engine determines whether the data items associated with the one or more field identifiers of the untyped data structure matches results of the type definitions of the field identifiers of the policy. Based on whether the data items associated with the one or more field identifiers of the untyped data structure matches results of the type definitions of the field identifiers of the policy, the policy engine determines whether the untyped data structure satisfies the policy or not.

Advantages of the present disclosure include, but are not limited to, providing a declarative policy that may be mutable with time and/or transforms the untyped data structure based on type definitions within the policy.

Figure 1:
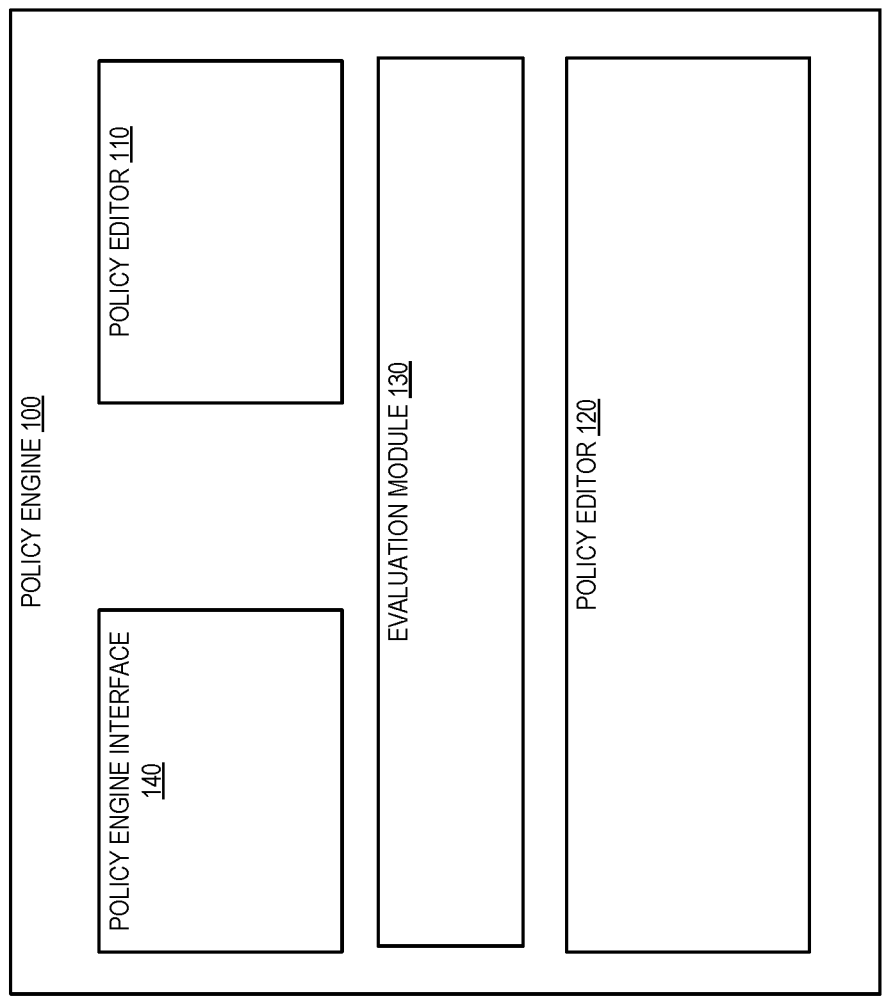
FIG. 1 depicts a high-level block diagram of an example policy engine that performs pattern-based matching, in accordance with one or more aspects of the present disclosure.

FIG. 1 depicts an illustrative architecture of elements of a policy engine 100, in accordance with an embodiment of the present disclosure. It should be noted that other architectures for policy engine 100 are possible, and that the implementation of a policy engine utilizing embodiments of the disclosure are not necessarily limited to the specific architecture depicted. In the example shown in FIG. 1, policy engine 100 may include a policy editor 110, a policy repository, an policy engine interface 140, and an evaluation module 130.

Policy editor 110 may be a tool or interface that allows policy administrators (e.g., admins) to create, modify, and delete policy rules (e.g., policies). Policy editor 110 may be included in or separate from the policy engine 100. Policies may define one or more field identifiers having a corresponding type definition to evaluate within an untyped data structure. The type definition may be a data type, a third-party request, an internal request, a function, a policy, a value. Types may include, for example, integer (e.g., int), character (e.g., char), a number having decimal (e.g., float or double), a collection of characters (e.g., string), true or false (e.g., Boolean), or any recursive composition of the aforementioned in a key/value-based structure. Internal request may be a request made within an organization and/or system to retrieve information, such as permitted license according to organization policies, clients or users of the organization, etc. Functions may be used to receive inputs, called parameters, and performs some operations on the inputs, and return an output. Third-party request may be a request to access and/or obtain data from third-party services, third-party repositories (e.g., Sigstore, OSV, etc.), third-party standards (e.g., CycloneDX, SPDX, OpenVEX, PEM, X.509, etc.), third-party applications, or etc.

Depending on the embodiment, the type definition may be further modified using set operations (e.g., union or intersection), logical operations (e.g., AND, OR, NOT, and XOR), conditions, constraints, or any suitable modification techniques that add complexity to the type definition to handle unique situations. For example, the set operations (e.g., union) may be used to create a type definition that can be satisfied in view of the two or more type definitions (e.g., a third party request U a function). In another example, a condition (e.g., 25<) may be used to create a type definition that can be satisfied in view of the condition (e.g., 25< value). In yet another example, constraints (e.g., only one match) may be used to create a type definition that can be satisfied in view of the constraints applied to the type definition (e.g., results of a third-party request must produce only one match).

Policy editor 110 may store policies in the policy repository. The policy repository may be a database or other storage mechanism that stores policies. The policy repository may be included in or separate from the policy engine 100.

The evaluation module 130 may receive, via the policy engine interface 140, an untyped data structure from a client of the policy engine to be evaluated. Clients of the policy engine 100 may be, for example, a developer, a continuous integration and continuous delivery/continuous deployment system, an integrated development environment (IDE), a runtime system, or etc. The policy engine interface 140 used by the clients to interact with the evaluation module 130 may be, for example, a web-based user interface, an application programming interface (API) (e.g., RESTful API), or a command line interface (e.g., CLI). The untyped data structure may be, for example, a JSON file, YAML file, XML file, or any structured data format.

The evaluation module 130 may evaluate the untyped data structure in view of a user-selected policy from the policy repository. The evaluation module 130 analyzes fields of the untyped data structure using field identifiers that match field identifiers of the user-selected policy (e.g., matching field identifiers). More specifically, the evaluation module 130 analyzes the data of each matching field identifier in the untyped data structure in view of the type definition of each field identifier in the user-selected policy.

In an exemplary embodiment, analyzing data associated with a matching field identifier in the untyped data structure with a field identifier in the user-selected policy having a type definition that is a data type, the evaluation module 130 determines whether a type of the data associated with the matching field identifier is (or matches) the data type of the field identifier in the user-selected policy. Depending on the embodiment, the data type of the field identifier in the user-selected policy may be modified using conditions, and/or constraints, accordingly, the evaluation module 130 may further determine that the type of the data associated with the matching field identifier is (or matches) the data type of the field identifier in the user-selected policy with the constraints and/or conditions applied. Responsive to a successful matching, the evaluation module 130 marks the field identifier in the user-selected policy as satisfied, otherwise, the field identifier in the user-selected policy is marked dissatisfied. In some embodiments, the evaluation module 130 may provide further information regarding the outcome of the user-selected policy based on one or more aspects of the user-selected policy.

In another exemplary embodiment, analyzing data associated with a matching field identifier in the untyped data structure with a field identifier in the user-selected policy having a type definition that is a policy, the evaluation module 130 retrieves the policy from the policy repository and evaluates whether the data associated with the matching field identifier satisfies the retrieved policy. The retrieved policy is evaluated similarly to the user-selected policy. Depending on the embodiment, the policy of the field identifier in the user-selected policy may be modified using conditions, and/or constraints, accordingly, the evaluation module 130 may further evaluate whether the data associated with the matching field identifier satisfies the retrieved policy with the constraints and/or conditions applied. Responsive to satisfying the retrieved policy, the evaluation module 130 marks the field identifier in the user-selected policy as satisfied, otherwise, the field identifier in the user-selected policy is marked dissatisfied.

In yet another exemplary embodiment, analyzing data associated with a matching field identifier in the untyped data structure with a field identifier in the user-selected policy having a type definition that is a function, the evaluation module 130 performs a function call, possibly using the data associated with the matching field identifier as an input, to obtain an output. Depending on the embodiment, the function of the field identifier in the user-selected policy and/or output of the function may be modified using conditions, and/or constraints, accordingly, the evaluation module 130 may further modify the function and/or output in view of the constraints and/or conditions applied. Responsive to performing the function call and receiving the output, the evaluation module 130 marks the field identifier in the user-selected policy as satisfied, otherwise, the field identifier in the user-selected policy is marked dissatisfied.

In yet another exemplary embodiment, analyzing data associated with a matching field identifier in the untyped data structure with a field identifier in the user-selected policy having a type definition that is a value, the evaluation module 130 determines whether a value of the data associated with the matching field identifier matches the value of the field identifier in the user-selected policy. Depending on the embodiment, the value of the field identifier in the user-selected policy may be modified using conditions, and/or constraints, accordingly, the evaluation module 130 may further determine that the value of the data associated with the matching field identifier is (or matches) the value of the field identifier in the user-selected policy with the constraints and/or conditions applied. Responsive to a successful matching, the evaluation module 130 marks the field identifier in the user-selected policy as satisfied, otherwise, the field identifier in the user-selected policy is marked dissatisfied.

In yet another exemplary embodiment, analyzing data associated with a matching field identifier in the untyped data structure with a field identifier in the user-selected policy having sub-type definitions that are modified using set operations (e.g., a first type definition U a second type definition, first type definition n second type definition, or first type definition-second type definition) or logical operations (e.g., a first type definition AND a second type definition, first type definition OR second type definition, first type definition XOR second type definition, or first type definition NOT second type definition) requires that the evaluation module 130 process each type definition involved (e.g., first type definition and second type definition). Once each type definition involved is processed, the evaluation module 130 performs the set operations or logical operations to obtain a result (e.g., a data set) to be used in the analysis of the data associated with a matching field identifier in the untyped data structure. Depending on the embodiment, the result of the field identifier in the user-selected policy and/or each type definition involved prior to obtaining the result of the field identifier in the user-selected policy may be modified using conditions, and/or constraints. The evaluation module 130 determines whether the data associated with the matching field identifier matches the result of the field identifier in the user-selected policy. Responsive to a successful matching, the evaluation module 130 marks the field identifier in the user-selected policy as satisfied, otherwise, the field identifier in the user-selected policy is marked dissatisfied.

Once each field identifier in the user-selected policy is evaluated in view of the untyped data structure, the evaluation module 130 determines whether the user-selected policy is satisfied. The evaluation module 130 determines whether the user-selected policy is satisfied by determining if each field identifier in the user-selected policy is satisfied. If each field identifier in the user-selected policy is satisfied, the user-selected policy as a whole is determined to have been satisfied. Otherwise, if at least one field identifier in the user-selected policy is dissatisfied, the user-selected policy as a whole is determined to be dissatisfied.

The evaluation module 130 may send a notification to the client in response to submitting the untyped data structure for evaluation. The notification notifies the client which policies were used to evaluate the untyped data structure and whether the policies were satisfied or not. Depending on the embodiment, the client may request further details regarding the notification indicating, for a specific policy or each of the policies, which field identifiers were satisfied and which field identifiers were dissatisfied. The client may further probe each field identifier to determine how the data from the untyped data structure either satisfied or dissatisfied the type definition of the field identifier. In order to provide the client with such granularity, the evaluation module 130 updates a log file during the evaluation of an untyped data structure against one or more policies. The evaluation module 130 may include the untyped data structure to be evaluated, the policy used to evaluate the untyped data structure, each field identifier and type definition of the policy, results of each type definition (e.g., results of the function, third-party request, etc.) of a field identifier, data associated with a matching field identifier in the untyped data structure being compared to the type definition(s) of the field identifier, the results of the comparison, a time stamp for each step of the evaluation, etc. The evaluation module 130 may display the log in a tree-like (or hierarchical) format, so each level of the tree represents a different level of indentation in the log file. For example, untyped data structure to policies, policies to field identifiers, field identifiers to type definitions, type definitions to data associated with untyped data structure. Each level displays a satisfied or dissatisfied marking. Thus, the user may be provided an outcome of the policy indicating "satisfied because" or "dissatisfied because" followed by each level that was satisfied or dissatisfied.

FIG. 2 depicts a flow diagram of an illustrative example of a method 200 for pattern-based matching for policy engine, in accordance with one or more aspects of the present disclosure. Method 200 and each of its individual functions, routines, subroutines, or operations may be performed by one or more processors of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by a policy engine as shown in FIG. 1 or by an executable code of a computing device, a virtual machine (e.g., guest operating system or virtual firmware), other executable code, or a combination thereof.

At block 210, the processing device receives an untyped data structure. The untyped data structure includes a plurality of data items and each data item includes a field identifier and corresponding data. The untyped data structure may be one of: a JSON file, a YAML file, or an XML file.

At block 220, the processing device identifies, based on one or more field identifiers of the untyped data structure, a policy to evaluate the untyped data structure. The policy specifies a field identifier and a corresponding type definition. The type definition may be at least one of: a data type, a third-party request, an internal request, a function, a policy, a value. The type definition may be further modified using at least one of: set operations, logical operations, conditions, or constraints. As previously described, the set of operations may be a union or intersection, and the logical operations may be an AND, OR, NOT, or XOR.

In some embodiments, to identify, based on one or more field identifiers of the untyped data structure, the policy to evaluate the untyped data structure, the processing device retrieves, from a repository, a plurality of stored policies and determines whether a field identifier of the stored policy is one of the one or more field identifiers of the untyped data structure for each stored policy of the plurality of stored policies. Responsive to determining that the field identifier of the stored policy is one of the one or more field identifiers of the untyped data structure, the processing device returns the stored policy to evaluate the untyped data structure. As previously described, the processing device determines whether the untyped data structure of a user selected policy of the policy repository includes field identifiers that match field identifiers of a respective policy.

At block 230, the processing device compares the type definition of the field identifier specified in the identified policy with data associated with a field identifier of the untyped data structure matching the field identifier of the identified policy. To compare the type definition of the field identifier specified in the identified policy with data associated with the field identifier of the untyped data structure matching the field identifier of the identified policy, the processing device obtains, based on the type definition of the field identifier specified in the identified policy, a result of the type definition and determines whether the result of the type definition matches the data associated with the field identifier of the untyped data structure matching the field identifier of the identified policy. As previously described, the processing device may further determine whether the result of the type definition with the constraints and/or conditions applied matches the data associated with the field identifier of the untyped data structure matching the field identifier of the identified policy. In some embodiment, the type definition may have been modified using set operations or logical operations which requires that each sub-type definition involved be processed. Once processed, the processing device may further determine whether the result of the set operations or logical operations of the processed sub-type definitions matches the data associated with the field identifier of the untyped data structure matching the field identifier of the identified policy.

At block 240, the processing device determines, based on the comparisons, whether the untyped data structure satisfies the identified policy. To determine whether the untyped data structure satisfies the identified policy, the processing device determines whether a result of the type definition matches the data associated with the field identifier of the untyped data structure matching the field identifier of the identified policy. Responsive to determining that the result of the type definition matches the data associated with the field identifier of the untyped data structure matching the field identifier of the identified policy, the processing device notifies a user that the untyped data structure satisfies the identified policy. Responsive to determining that the result of the type definition does not match the data associated with the field identifier of the untyped data structure matching the field identifier of the identified policy, the processing device notifies a user that the untyped data structure does not satisfy the identified policy.

Figure 3:
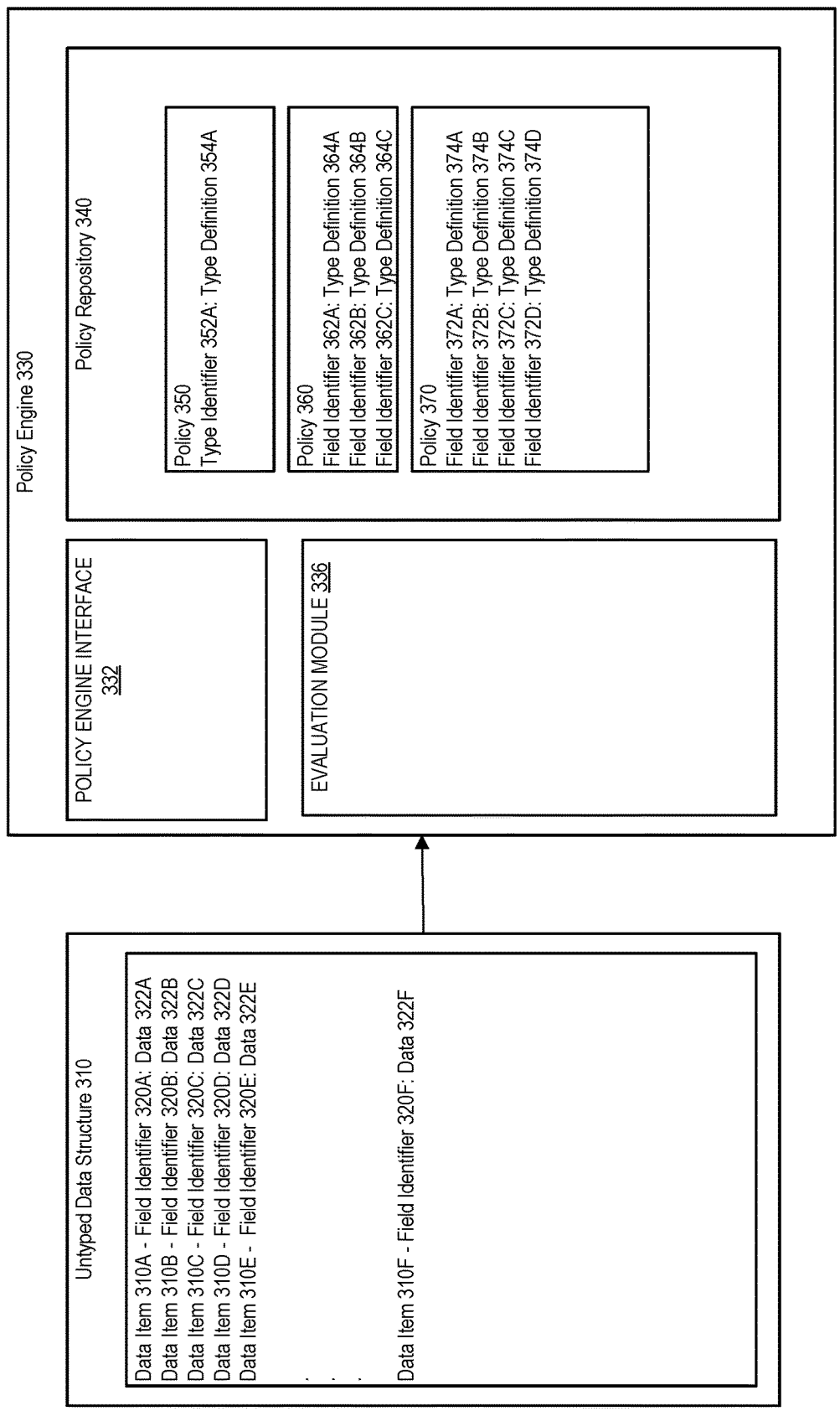
FIG. 3 depict an example untyped data structure submitted to a policy engine for pattern-based matching, in accordance with one or more aspects of the present disclosure.

FIG. 3 depict an example untyped data structure submitted to a policy engine for pattern-based matching, in accordance with one or more aspects of the present disclosure. Policy Engine 300 may be similar to policy engine 100 of FIG. 1. The policy engine 330 may receive via a policy engine interface 332, similar to policy engine interface 140 of FIG. 1, an untyped data structure 310. The untyped data structure 310 may include a plurality of data items (e.g., data item 310A-310F). Each data item of the plurality of data items may include a field identifier (e.g., field identifier 320A-F, respectively) and corresponding data (e.g., data 322A-F, respectively). The evaluation module 336, similar to the policy module 130 of FIG. 1, may evaluate the received untyped data structure in view of one or more policies located in a policy repository 340. The policy repository 340 may include a plurality of policies (e.g., policy 350, 360, and 370). Each policy includes one or more field identifiers (e.g., 352A, 362A-C, and 372A-D, respectively) and a corresponding type definition (e.g., 354A, 364A-C, and 374A-D, respectively). As previously described, the type definition may be a data type, a third-party request, an internal request, a function, a policy, a value.

The evaluation module 336, evaluates the received untyped data structure in view of a user-selected policy located in a policy repository 340 (e.g., policy 350). The evaluation module 336 analyzes the data (e.g., data 322C) in the untyped data structure 310 in view of the type definition of each field identifier in the user-selected policy (e.g., type definition 354A associated with field identifier 352A of policy 350). More specifically, as described above, based on the type of the definition, the data is compared with a result of the type definition. Responsive to a successful matching or comparison, the evaluation module 336 marks the field identifier in the user-selected policy (e.g., field identifier 352A of policy 350) as satisfied, otherwise, the field identifier in the user-selected policy is marked dissatisfied. Once each field identifier in the user-selected policy (e.g., field identifier 352A of policy 350) is evaluated in view of the untyped data structure, the evaluation module 336 determines whether the user-selected policy (e.g., policy 350) is satisfied. The evaluation module 336 determines whether the user-selected policy (e.g., policy 350) is satisfied by determining if each field identifier in the user-selected policy (e.g., field identifier 352A of policy 350) is satisfied. If each field identifier in the user-selected policy is satisfied, the user-selected policy as a whole is determined to have been satisfied. Otherwise, if at least one field identifier in the user-selected policy is dissatisfied, the user-selected policy as a whole is determined to be dissatisfied. A notification is returned indicating whether the policy was satisfied or not based on the results of the user-selected policy.

FIG. 4 depicts a flow diagram of an illustrative example of a method 400 for pattern-based matching for policy engine, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a policy engine as shown in FIG. 1 or by an executable code of a computing device, a virtual machine (e.g., guest operating system or virtual firmware), other executable code, or a combination thereof.

At block 410, the processing device identifies one or more policies to evaluate an untyped data structure. Each policy specifies a field identifier and a corresponding type definition. To identify one or more policies to evaluate the untyped data structure, the processing devices retrieves, from a repository, a plurality of stored policies based on user selection. The processing device returns a stored policy that matches the user selection as a policy to evaluate the untyped data structure.

At block 420, for each policy of the one or more policies, the processing device determines whether the untyped data structure satisfies a respective policy by analyzing the untyped data structure for data associated with a field identifier of the untyped data structure in view of a type definition of a matching field identifier of the respective policy. To determine whether the untyped data structure satisfies the respective policy by analyzing the untyped data structure for data associated with a field identifier of the untyped data structure in view of a type definition of the matching field identifier of the respective policy, the processing device determines whether a result of the type definition of the matching field identifier of the respective policy matches data associated with the field identifier of the untyped data structure that matches the matching field identifier of the respective policy.

In some embodiments, responsive to determining that the result of the type definition of the matching field identifier of the respective policy matches data associated with the field identifier of the untyped data structure that matches the matching field identifier of the respective policy, the processing device marks the matching field identifier of the respective policy. Responsive to determining that each identifier of the respective policy is marked as satisfied, the processing device determines that the untyped data structure satisfies the respective policy.

In some embodiments, responsive to determining that the result of the type definition of the matching field identifier of the respective policy does not match data associated with the field identifier of the untyped data structure that matches the matching field identifier of the respective policy, the processing device marks the matching field identifier of the respective policy as dissatisfied. Responsive to determining that a field identifier of the respective policy is marked as dissatisfied, the processing device determines that the untyped data structure does not satisfy the respective policy.

Figure 5:
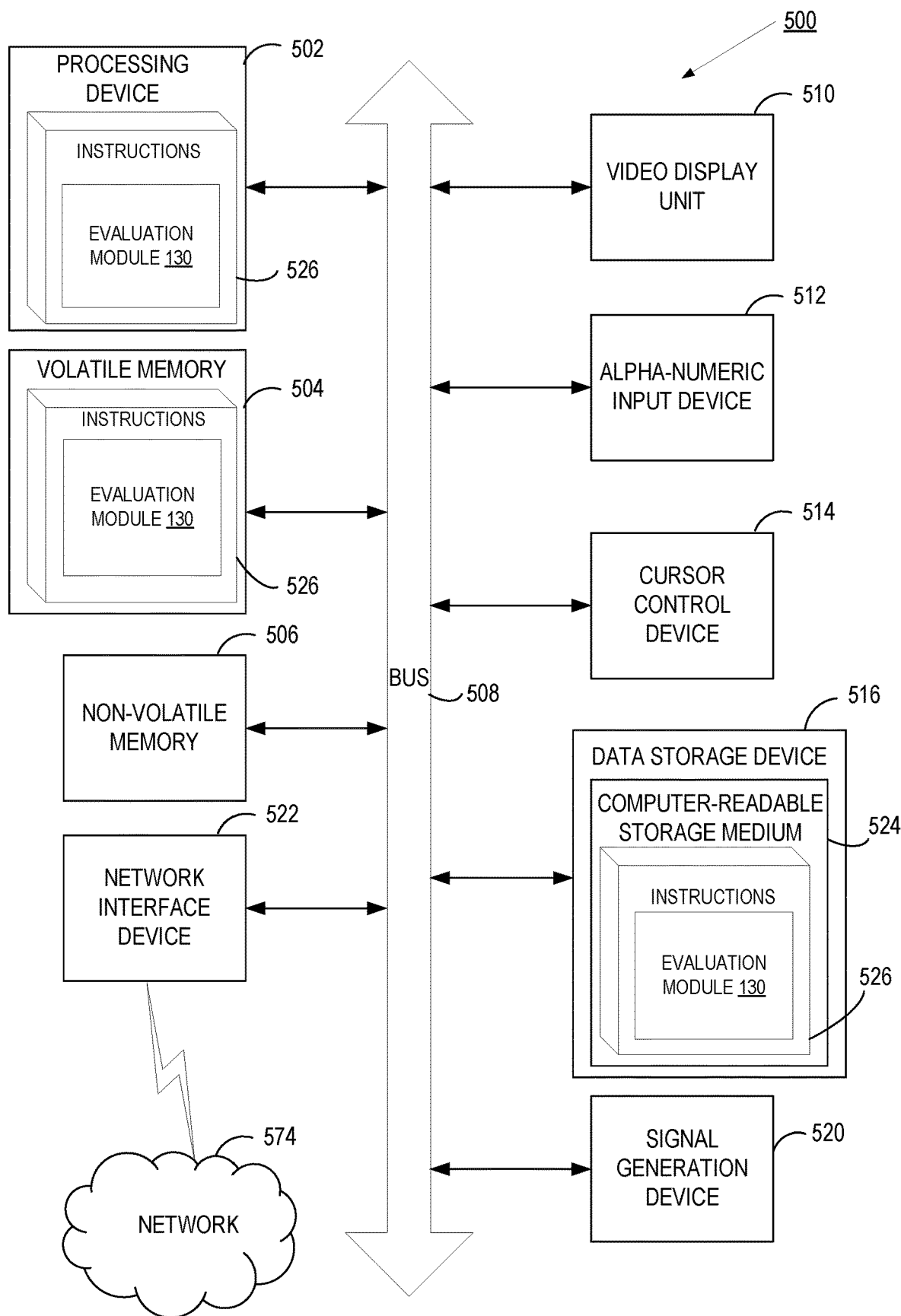
FIG. 5 depicts a block diagram of an example computer system operating in accordance with one or more aspects of the present disclosure.

FIG. 5 depicts a block diagram of a computer system operating in accordance with one or more aspects of the present disclosure. In various illustrative examples, computer system 500 may correspond to a policy engine 100 of FIG. 1. Computer system 500 may be included within a data center that supports virtualization. Virtualization within a data center result in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field identifier programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 200 and 400.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating,"

"using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 200 and 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving an untyped data structure comprising a field identifier and corresponding data, wherein the corresponding data is untyped with respect to a data type;
    identifying, based on the field identifier of the untyped data structure, a policy to evaluate the untyped data structure, wherein the policy specifies a type definition respective to a matching field identifier specified in the policy that matches the field identifier of the untyped data structure, the type definition comprising a constraint on a value of the corresponding data;
    comparing the type definition respective to the matching field identifier specified in the policy with the corresponding data associated with the field identifier of the untyped data structure based on the constraint of the type definition specified in the policy;
    determining, based on the comparison of the type definition to the corresponding data, whether the untyped data structure satisfies the policy; and
    transforming the untyped data structure based on the type definition of the field identifier specified in the policy.

2. The method of claim 1, wherein the untyped data structure is one of: a JSON file, a YAML file, or an XML file.

3. The method of claim 1, wherein the type definition is at least one of: a data type, a third-party request, an internal request, a function, or a value.

4. The method of claim 1, wherein identifying the policy to evaluate the untyped data structure comprises:
    retrieving, from a repository, a plurality of stored policies;
    for each stored policy of the plurality of stored policies, determining whether a field identifier of the stored policy matches the field identifier of the untyped data structure; and
    responsive to determining that the field identifier of the stored policy matches the field identifier of the untyped data structure, returning the stored policy as the policy to evaluate the untyped data structure.

5. The method of claim 1, wherein comparing the type definition respective to the matching field identifier specified in the policy with the corresponding data associated with the field identifier of the untyped data structure:
    obtaining, based on the type definition respective to the matching field identifier specified in the policy, a result of the type definition; and
    determining whether the result of the type definition matches the corresponding data associated with the field identifier of the untyped data structure.

6. The method of claim 1, wherein the type definition may be further modified using at least one of: set operations, logical operations, conditions, or constraints.

7. The method of claim 1, wherein determining, based on the comparison of the type definition to the corresponding data, whether the untyped data structure satisfies the policy comprises:
    determining whether a result of the type definition matches the corresponding data associated with the field identifier of the untyped data structure; and
    responsive to determining that the result of the type definition matches the corresponding data associated with the field identifier of the untyped data structure, notifying a user that the untyped data structure satisfies the policy.

8. The method of claim 7, further comprising:
    responsive to determining that the result of the type definition does not match the corresponding data associated with the field identifier of the untyped data structure, notifying a user that the untyped data structure does not satisfy the policy.

9. A system comprising:
    a memory device;
    a processing device, operatively coupled to the memory device, to perform operations comprising:
        receiving an untyped data structure comprising a field identifier and corresponding data, wherein the corresponding data is untyped with respect to a data type;
        identifying, based on the field identifier of the untyped data structure, a policy to evaluate the untyped data structure, wherein the policy specifies a type definition respective to a matching field identifier specified in the policy that matches the field identifier of the untyped data structure, the type definition comprising a constraint on a value of the corresponding data;
        comparing the type definition respective to the matching field identifier specified in the policy with the corresponding data associated with the field identifier of the untyped data structure based on the constraint of the type definition specified in the policy;
        determining, based on the comparison of the type definition to the corresponding data, whether the untyped data structure satisfies the policy; and transforming the untyped data structure based on the type definition of the field identifier specified in the policy.

10. The system of claim 9, wherein the untyped data structure is one of: a JSON file, a YAML file, or an XML file.

11. The system of claim 9, wherein the type definition is at least one of: a data type, a third-party request, an internal request, a function, or a value.

12. The system of claim 9, wherein identifying the policy to evaluate the untyped data structure comprises:
retrieving, from a repository, a plurality of stored policies;
for each stored policy of the plurality of stored policies, determining whether a field identifier of the stored policy matches the field identifier of the untyped data structure; and
responsive to determining that the field identifier of the stored policy matches the field identifier of the untyped data structure, returning the stored policy as the policy to evaluate the untyped data structure.

13. The system of claim 9, wherein comparing the type definition respective to the matching field identifier specified in the policy with the corresponding data associated with the field identifier of the untyped data structure:
obtaining, based on the type definition respective to the matching field identifier specified in the policy, a result of the type definition; and
determining whether the result of the type definition matches the corresponding data associated with the field identifier of the untyped data structure.

14. The system of claim 9, wherein the type definition may be further modified using at least one of: set operations, logical operations, conditions, or constraints.

15. The system of claim 9, wherein determining, based on the comparison of the type definition to the corresponding data, whether the untyped data structure satisfies the policy comprises:
determining whether a result of the type definition matches the corresponding data associated with the field identifier of the untyped data structure; and
responsive to determining that the result of the type definition matches the corresponding data associated with the field identifier of the untyped data structure, notifying a user that the untyped data structure satisfies the policy.

16. The system of claim 15, wherein the processing device is to perform operations further comprising:
responsive to determining that the result of the type definition does not match the corresponding data associated with the field identifier of the untyped data structure, notifying a user that the untyped data structure does not satisfy the policy.

17. A non-transitory computer-readable storage medium including instructions that, when executed by a processing device, cause the processing device to perform a method comprising:
identifying one or more policies to evaluate an untyped data structure that is untyped with respect to a data type, wherein each policy specifies a field identifier and a corresponding type definition, the corresponding type definition comprising a constraint on a value of corresponding data of the untyped data structure respective to a matching field identifier of the untyped data structure, the matching field identifier of the untyped data structure matching the field identifier specified in the policy; and
for each policy of the one or more policies, determining whether the untyped data structure satisfies the policy by analyzing the untyped data structure for the corresponding data associated with the matching field identifier of the untyped data structure in view of the corresponding type definition of the field identifier of the policy and based on the constraint respective to the corresponding type definition specified in the policy.

18. The non-transitory computer-readable storage medium of claim 17, wherein identifying one or more policies to evaluate the untyped data structure comprises:
retrieving, from a repository, a plurality of stored policies;
for each stored policy of the plurality of stored policies, determining whether a field identifier of the stored policy matches the matching field identifier of the untyped data structure; and
responsive to determining that the field identifier of the stored policy matches the matching field identifier of the untyped data structure, returning the stored policy as the policy to evaluate the untyped data structure.

19. The non-transitory computer-readable storage medium of claim 17, wherein determining whether the untyped data structure satisfies the policy comprises:
determining whether a result of the corresponding type definition of the field identifier of the policy matches the corresponding data associated with the matching field identifier of the untyped data structure that matches the field identifier of the policy;
responsive to determining that the result of the corresponding type definition of the field identifier of the policy matches the corresponding data associated with the matching field identifier of the untyped data structure that matches the field identifier of the policy, marking the field identifier of the policy as satisfied; and
responsive to determining that the field identifier of the policy is marked as satisfied, determining that the untyped data structure satisfies the policy.

20. The non-transitory computer-readable storage medium of claim 19, wherein determining whether the untyped data structure satisfies the policy further comprises:
responsive to determining that the result of the corresponding type definition of the field identifier of the policy does not match the corresponding data associated with the matching field identifier of the untyped data structure that matches the field identifier of the policy, marking the field identifier of the policy as dissatisfied; and
responsive to determining that the field identifier of the policy is marked as dissatisfied, determining that the untyped data structure does not satisfy the policy.

* * * * *